United States Patent
Don et al.

(10) Patent No.: US 10,585,823 B2
(45) Date of Patent: Mar. 10, 2020

(54) LEVELING IO

(71) Applicant: EMC Corporation, Hopkinton, MA (US)

(72) Inventors: Arieh Don, Newton, MA (US); Assaf Natanzon, Tel Aviv (IL)

(73) Assignee: EMC IP Holding Company LLC, Hopkinton, MA (US)

(*) Notice: Subject to any disclaimer, the term of this patent is extended or adjusted under 35 U.S.C. 154(b) by 885 days.

(21) Appl. No.: 14/501,808

(22) Filed: Sep. 30, 2014

(65) Prior Publication Data

US 2016/0092380 A1    Mar. 31, 2016

(51) Int. Cl.
| | |
|---|---|
| *G06N 7/02* | (2006.01) |
| *G06N 7/04* | (2006.01) |
| *G06N 7/06* | (2006.01) |
| *G06N 7/08* | (2006.01) |
| *G06F 13/18* | (2006.01) |

(52) U.S. Cl.
CPC .................................. *G06F 13/18* (2013.01)

(58) Field of Classification Search
CPC ...... G06N 99/005; G06N 5/025; G06N 7/005; G06K 9/6256; G06K 9/6269; G06F 13/18; G06F 13/26
See application file for complete search history.

(56) References Cited

U.S. PATENT DOCUMENTS

| | | | | |
|---|---|---|---|---|
| 5,894,583 A * | 4/1999 | Johnson | ................. | G06F 9/4825 710/260 |
| 7,124,249 B1 * | 10/2006 | Darcy | ................. | G06F 12/0864 711/122 |
| 8,190,948 B1 * | 5/2012 | Marshak | ............. | G06F 11/2064 714/18 |
| 8,341,314 B2 * | 12/2012 | Muppirala | .......... | G06F 13/1642 710/15 |
| 8,392,623 B2 * | 3/2013 | Subramanian | ...... | G06F 9/45558 710/2 |
| 2003/0065835 A1 * | 4/2003 | Maergner | .............. | G06F 9/5027 710/61 |
| 2005/0268136 A1 * | 12/2005 | Kostadinov | ............... | G06F 1/14 713/400 |
| 2006/0064697 A1 * | 3/2006 | Kagi | ..................... | G06F 9/5011 718/103 |
| 2006/0184939 A1 * | 8/2006 | Sahoo | ..................... | G06F 9/505 718/100 |
| 2007/0156974 A1 * | 7/2007 | Haynes, Jr. | ........... | H04L 69/168 711/147 |

(Continued)

OTHER PUBLICATIONS

Systems Support for Preemptive Disk Scheduling—2005 Zoran Dimitrijevi c, Member, IEEE, Raju Rangaswami, Member, IEEE, and Edward Y. Chang, Senior Member, IEEE.*

(Continued)

*Primary Examiner* — Kakali Chaki
*Assistant Examiner* — Ababacar Seck
(74) *Attorney, Agent, or Firm* — Krishnendu Gupta; Deepika Bhayana; Dorothy Chiang

(57) ABSTRACT

A method, system, and computer program product for IO leveling comprising receiving an IO, determining if there is a delay for processing IO because of pending IO, based on a positive determination there is a delay for processing IO, determining a priority for the IO, and based on the priority of IO determining whether to process the IO.

18 Claims, 18 Drawing Sheets

(56) References Cited

U.S. PATENT DOCUMENTS

| | | | | |
|---|---|---|---|---|
| 2008/0071947 A1* | 3/2008 | Fischer | ............... | G06F 13/24 |
| | | | | 710/48 |
| 2008/0183913 A1* | 7/2008 | Ryu | ............... | G06F 13/28 |
| | | | | 710/25 |
| 2010/0083256 A1* | 4/2010 | Green | ............... | G06F 9/5083 |
| | | | | 718/101 |
| 2010/0115154 A1* | 5/2010 | Tomonaga | ............... | G06F 13/4022 |
| | | | | 710/38 |
| 2010/0223427 A1* | 9/2010 | Chan | ............... | G06F 3/0611 |
| | | | | 711/114 |
| 2012/0173815 A1* | 7/2012 | Chan | ............... | G06F 3/0611 |
| | | | | 711/114 |
| 2013/0007755 A1* | 1/2013 | Chambliss | ............... | G06F 9/46 |
| | | | | 718/103 |
| 2015/0169341 A1* | 6/2015 | Gulati | ............... | G06F 9/45533 |
| | | | | 718/1 |

OTHER PUBLICATIONS

Self-Learning Disk Scheduling—2009 Yu Zhang and Bharat Bhargava, Fellow, IEEE.*
Operating Systems Steven Hand Michaelmas / Lent Term 2008/09 (Year: 2008).*

* cited by examiner

COMMAND: WRITE 1405
LOCATION (LOGICAL BLOCK ADDRESS (LBA))
SIZE (COUNT - HOW MANY BLOCKS)
NUMBER OF REJECTED TIMES

FIG. 14

LEVELING IO

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems may include different resources used by one or more host processors. Resources and host processors in a computer system may be interconnected by one or more communication connections. These resources may include, for example, data storage systems, such as the Symmetrix™ and Clariion families of data storage systems manufactured by EMC Corporation. These data storage systems may be coupled to one or more host processors and provide storage services to each host processor. An example data storage system may include one or more data storage devices, such as those of the Clariion family, that are connected together and may be used to provide common data storage for one or more host processors in a computer system.

A host processor may perform a variety of data processing tasks and operations using the data storage system. For example, a host processor may perform basic system I/O operations in connection with data requests such as data read and write operations. Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, U.S. Pat. No. 8,086,760 to Gruttadauria, which are hereby incorporated by reference in their entirety. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units neither may or may nor correspond to the actual disk drives. Allowing multiple host systems to access the single storage device unit allows the host systems to share data stored therein.

It is desirable to manage and monitor data storage systems for a variety of different reasons, such as, for example, to obtain configuration data and/or performance data. System configuration information may be obtained in connection with a system configuration modification such as, for example, a logical or physical device reconfiguration.

A data storage system to be managed and monitored may use the internet Small Computer System Interface (iSCSI) protocol, which is based on Small Computer System Interface (SCSI) and Transmission Control Protocol (TCP) protocols which are well known within the art of computer science. In brief, SCSI is a standard specifying the interface between devices that were originally controllers and peripherals in computer systems. The SCSI architecture is a client-server architecture wherein clients and servers are called "initiators" and "targets," respectively. Initiators send service requests to targets and receive responses from targets.

A target is a collection of logical units. Each logical unit contains a device server, one or more task sets (queues), and a task manager.

SCSI recognizes two types of requests: device-server requests and task-management requests. The device server processes the device-server commands while the task manager is responsible for task management.

A device-server request is a SCSI command for execution on a logical unit, such as a block read/write command. Each device-server request defines a unit of work for a logical unit. Within a logical unit, a task represents a unit of work.

A SCSI task is an execution context a target creates for a SCSI command or a series of linked SCSI commands. A new task is created for each single command, while the same task is used for all the commands in a series of linked commands, also referred to as a "chain of commands." A task persists until a command (or a series of linked commands) completion response is sent or until the task is ended by a task management function or exception condition. The initiator sends the next linked command in a series of linked commands only after the current command completes. That is, only one pending command exists per task. From the initiator's point of view, the device server is not multi-tasking; a task executes until it completes. This property allows initiators to implement, for example, read-modify-write commands using linked commands.

Task management requests control the execution of tasks. Examples of task management requests include aborting a task, clearing an exception condition and resetting a logical unit. The task manager manages task queues and serves task management requests.

Both initiators and targets have ports to communicate with their counterparts. The requests and responses are sent through and received from these ports. An initiator or target has one or more ports. Each port has a unique identifier. Each request includes its initiator and target port identifiers. These identifiers are in a "nexus object" in the request. In addition, the nexus object optionally contains an identifier for the logical unit and the task. The logical unit identifier is included if the request is destined for a particular logical unit. Similarly, the task identifier is included if the request is for a specified task.

SCSI is described more fully in the SCSI-3 Architecture Model (SAM), available at www.ansi.org as ANSI X3.270-1996, in the SCSI Architecture Model-2 (SAM-2), available at ftp://ftp.t10.org/t10/drafts/sam2/sam2r22.pdf, and in the references mentioned therein.

The iSCSI protocol maps the SCSI remote procedure invocation model over the TCP protocol. iSCSI requests carry SCSI commands, and iSCSI responses carry SCSI responses and status. iSCSI also uses the request-response mechanism for iSCSI protocol mechanisms.

iSCSI is described more fully in iSCSI, available at http://search.ietf.org/internet-drafts/draft-ietf-ips-iscsi-11.txt, and in the references mentioned therein.

With the advent of iSCSI, data storage systems may be linked to facilitate the formation of Storage Area Networks (SANs) having increased capabilities and improved performance. SANs that include servers and data storage devices may be interconnected over longer distances, e.g. over IP networks, such as the Internet. For example, iSCSI may be supported over physical media that supports TCP/IP as a transport, and iSCSI implementations may be on Gigabit Ethernet, supporting speeds of at least 10 Gbyte/sec.

iSCSI, more particularly, comprises the rules and processes to transmit and receive block storage applications over TCP/IP networks, and particularly the iSCSI protocol enables SCSI commands to be encapsulated in TCP/IP packets and delivered over IP networks. Thus, implementing SCSI commands over IP networks may be used to facilitate block-level data transfers over Intranets, local area networks (LANs), wide area networks (WANs), the Internet, and the like, and can enable location-independent data storage and retrieval, e.g., at remote workstations or devices.

Each iSCSI device (target or initiator) is allocated a unique name and address. There are two standards which can be employed for iSCSI device naming; EUI (Enterprise Unique Identifier) or IQN (iSCSI Qualified Name). A fully qualified IQN includes the iSCSI target's name and an identifier for the shared iSCSI node or logical volume ("LUN").

Several discovery methods can be implemented in an iSCSI environment. The administrator can manually specify IP addresses and IQN names to the initiator and target devices. Alternatively, the initiator can use a SendTargets operation to discover targets, such that the address of a target device is specified manually and the initiator establishes a discovery session to perform the SendTargets operation. The target device responds by sending a complete list of additional targets that are available to the initiator. This method is semi-automated, such that the administrator may still need to enter a range of target addresses. Internet Storage Name Service (iSNS) provides a discovery method for both naming and resource discovery for devices on an IP based SAN. The iSNS protocol uses an iSNS server as the central location for tracking information about targets and initiators. An iSNS server can be run on any host, initiator, or target on the SAN. An iSNS client is required on each initiator or target to enable communication with the iSNS Server. In the initiator, the iSNS client registers the initiator and queries the list of targets. In the target, the iSNS client registers the target with the server.

For an initiator to transmit information to a target, the initiator must first establish a session with the target through an iSCSI logon process. This process starts the TCP/IP connection, verifies that the initiator has access to the target (authentication), and allows negotiation of various parameters including the type of security protocol to be used, and the maximum data packet size. If the logon is successful, an ID is assigned to both initiator (an initiator session ID, or ISID) and target (a target session ID, or TSID). Thereafter, the full feature phase—which allows for reading and writing of data—can begin. Multiple TCP connections can be established between each initiator target pair, allowing unrelated transactions during one session. Sessions between the initiator and its storage devices generally remain open, but logging out is available as an option.

Since iSCSI operates in the Internet environment, security can be important. The iSCSI protocol specifies the use of IP security (IPsec) to help ensure that the communicating end points (initiator and target) are authentic, the transferred data has been secured through encryption and is thus kept confidential, data integrity is maintained without modification by a third party, and data is not processed more than once, even if it has been received multiple times. The iSCSI protocol also specifies that Challenge Handshake Authentication Protocol (CHAP) be implemented to further authenticate end node identities.

Installation of a data storage system such as an iSCSI based data storage system can be a complicated process, particularly for the user. For example, initializing a new iSCSI based data storage system and connecting a server to an iSCSI storage system can involve complicated tasks requiring the user to execute and navigate multiple stand-alone software utilities, typically on both the storage system and the server to be connected.

For example, a Microsoft iSCSI initiator software package runs on various Microsoft Windows operating systems. The package includes several software components, including Microsoft Initiator and Microsoft Initiator Service. Microsoft Initiator is an iSCSI device driver component that is responsible for moving data from a storage stack to a standard network stack. Microsoft Initiator is used only when iSCSI traffic goes over standard network adapters (also referred to as network interface cards, or NICs), not when specialized iSCSI adapters are used. Microsoft Initiator Service is a service that manages all iSCSI initiators (including network adapters and host bus adapters (HBAs)) on behalf of the operating system. Its functions include aggregating discovery information and managing security. It includes an iSNS client, including functionality used for device discovery.

Microsoft Initiator functions with a network stack (iSCSI over TCP/IP) and supports both standard Ethernet network adapters and TCP/IP offloaded network adapters. Microsoft Initiator Service provides storage management functionality including discovery and aggregation of multiple discovery mechanisms (iSNS, SendTarget, and manual configuration by an administrator), security and iSNS server and client support for security credentials, session initiation and termination and parameter settings for iSCSI sessions, and device management including providing HBA or network adapter-based initiators with the necessary parameters.

Microsoft Initiator Service enables the host computer system to discover target storage devices on the storage area network and to determine whether or not it has access to those devices. iSNS client code of Microsoft Initiator Service allows the Service to maintain a list of targets reported via the iSNS server as changes are made.

Microsoft Initiator, in accordance with iSCSI standards, uses IPsec for encryption and CHAP for authentication.

Microsoft Initiator Service has a common application programming interface (API) that can be used for configuring both Microsoft Initiator and iSCSI HBAs.

SUMMARY

A method, system, and computer program product for IO leveling comprising receiving an IO, determining if there is a delay for processing IO because of pending IO, based on a positive determination there is a delay for processing IO, determining a priority for the IO, and based on the priority of IO determining whether to process the IO.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 14 is a simplified illustration a table entry used to keep track of how many times an IO has been rejected, in accordance with an embodiment of the present disclosure;

DETAILED DESCRIPTION

Figure 1:
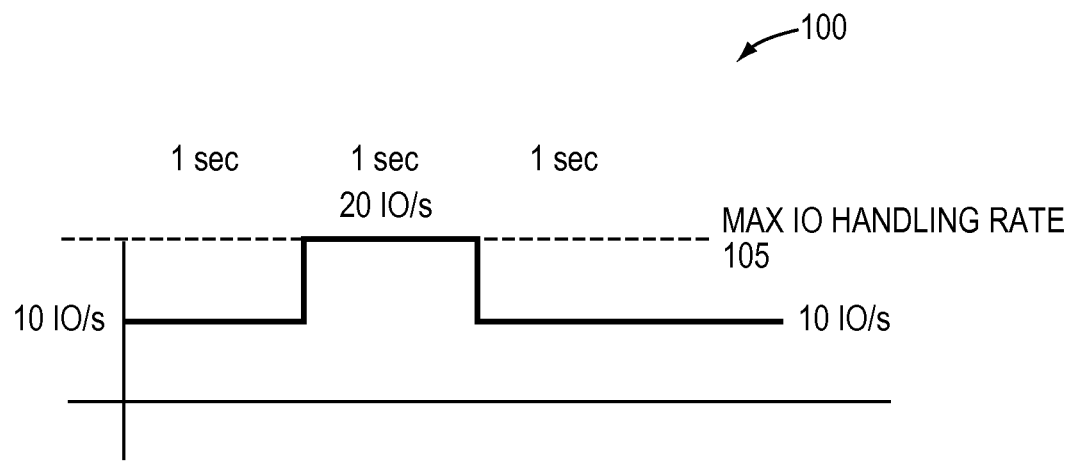
FIG. 1 is a simplified illustration of IOs processing over time, in accordance with an embodiment of the present disclosure.

Generally, TCPIP is a network connection protocol. Typically, the TCPIP protocol may have error correction protocols and methodology. Usually, TCPIP is able to accommodate long wait times after sending an IO to a target. Alternatively, fiber channel is another network connection protocol. Generally, fiber channel may not have the same type of error correction protocol. Conventionally, fiber channel may fail IO after a response has not been received within a specified period of time. Usually, the period of time may be 30 seconds. In certain embodiments, a host may drive IO over fiber channel.

Today, since certain storage systems have limited random IO performance, such as with an exposed file as a SCSI device using vDisk, an I/O burst may cause commands to be queued for long periods of time, causing the command to time out, and causing the application to crash. Conventionally, if a host application does not receive a response to an IO sent over fiber channel within a specified period of time, the host application will crash. Typically, if the host application receives a response, such as the IO was not able to be processed, the host application may try to resend the IO. Usually, IO is send from a host to a storage array. SCSI and ISCSI as well as FCOE and fiber channel may have problems handling IO bursts. As used herein, Applicants generally refer to fiber channel as an example protocol within the embodiments, but the current disclosure is useful in other types of protocols to mitigate IO bursts.

In most embodiments, a system with fiber channel may be designed so the speed of a fiber channel link may be set for an average amount of data transfer. In many embodiments, when the amount of IO sent over the fiber channel link exceeds the average speed set for the link, this may result in delayed IO. In some embodiments, if an IO is delayed more than a specific period of time without a response, this may cause the application sending the IO to crash. In at least some embodiments, if there is IO transfer over fiber channel and there is a consistent surge across the fiber channel which exceeds the ability for the IO to be handled, then the applications relying on the IO processing may fail.

In some embodiments, the current disclosure enables fiber channel and other protocols to handle surges of IO traffic. In certain embodiments, if a storage array or target is unable to handle all the IO sent by a host, the storage array may send an IO abort or retry command to the host before the IO times out. In many embodiments, this may cause the host to resend or re-drive the IO to the storage array. In most embodiments, the storage array may keep a list of IOs that it has rejected. In some embodiments, when choosing whether to process or reject an IO, a storage array may determine whether the IO has been previously rejected. In other embodiments, the storage array may determine how many times the IO has been rejected and give a higher priority, in respect to processing priority, to those IOs that have been previously rejected. In many embodiments, sending an IO abort command before the IO times out may enable the storage array or device processing the IO to smooth out IO spikes.

In certain embodiments, the current disclosure may provide a method for delaying hosts IOs to a slow storage system avoiding IO failures. In some embodiments, a machine learning algorithm may be used to prevent command failures. In many embodiments, a machine learning or other type of algorithm may be used to mitigate the burst/small-quota and avoid application crashing. In certain embodiments, each write arriving to a vdisk or storage device may be queued. In many embodiments, queued I/O may have a timer counting the time it has been queued. In certain embodiments, there is a short I/O burst, then the queued I/O may get serviced later when the device is inactive and has unused quota. In other embodiments, if IO is queued for too long a timeout may occur.

In most embodiments, in the event of long burst that results in many queued commands, a Machine Learning Mode (MLM) or other algorithm may be used to mitigate timeouts. In some embodiments, an algorithm may involve a storage device or vdisk looking at the per-command queued-timer and choosing commands that have been queued for N sec already (the value of N may fluctuate as part of the learning process). In certain embodiment, a Vdisk or storage device may record the LBA/count in a table in the memory+a retry counter=1—and reject the command with OB/44 chk-cond (command failed retry). In most embodiments, a 0b/44 chk-cond status may result with a host bus adapter (HBA) re-driving or resending the command.

In some embodiments, the time between a rejection and re-driving the cmd may also give the target some time to process other queued commands. In most embodiments, when a target gets a command (after MLM was activated): if unused quota/credit is available—the vdisk or storage device may process the cmd. In certain embodiments, if there is not quota after a rejection, the target may check the LBA/CNT table in memory- and if (retry counter<MAX_RETRY) the target may queue the command incrementing the "retry counter." In most embodiments, the target may continue queuing the command until a max re-try count is reached, which may be dynamic per MLM. In almost all embodiments, when max retry has been reached, the target may process the command regardless of the pending quota. In many embodiments, the forced handling of the IO may protect an application from timeout that may result in a crash.

Figure 2:
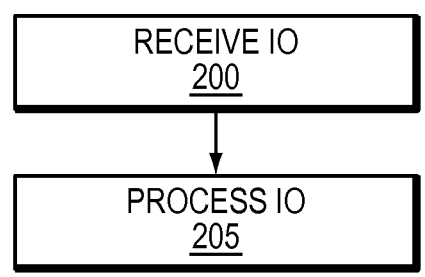
FIG. 2 is a simplified example of a method for processing IO over time, in accordance with an embodiment of the present disclosure.

Refer now to the embodiments of FIGS. 1 and 2, which illustrate IO processing. The graph of FIG. 1 shows an IO at second 1 to be 10 IOs/s a second, IOs at second 2 to be 20 IOs, the maximum IO that can be handled 105, and the IOs at second three to be 10 IOs a second. IOs are received (step 200). IOs are processed (step 205).

Figure 3:
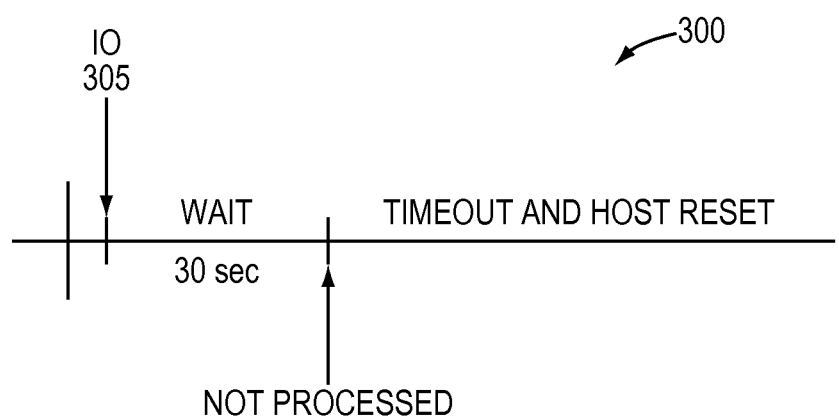
FIG. 3 is a simplified illustration of an IO timeout, in accordance with an embodiment of the present disclosure.
Figure 4:
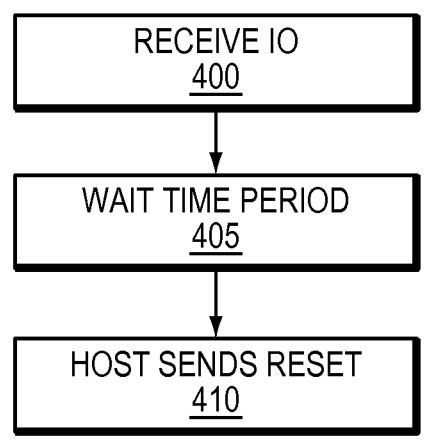
FIG. 4 is a simplified example of a method of what occurs when an IO times out, in accordance with an embodiment of the present disclosure.

Refer now to the example embodiments of FIGS. 3 and 4. IO 305 is received (step 400). IO 305 waits for 30 seconds (step 405). IO 305 is not processed, timeouts, and the hosts considers the IO to be failed and sends a reset. (step 410). In many embodiments the IO timeout time may be any value. In further embodiments, the IO timeout time may be set by a user.

Figure 5:
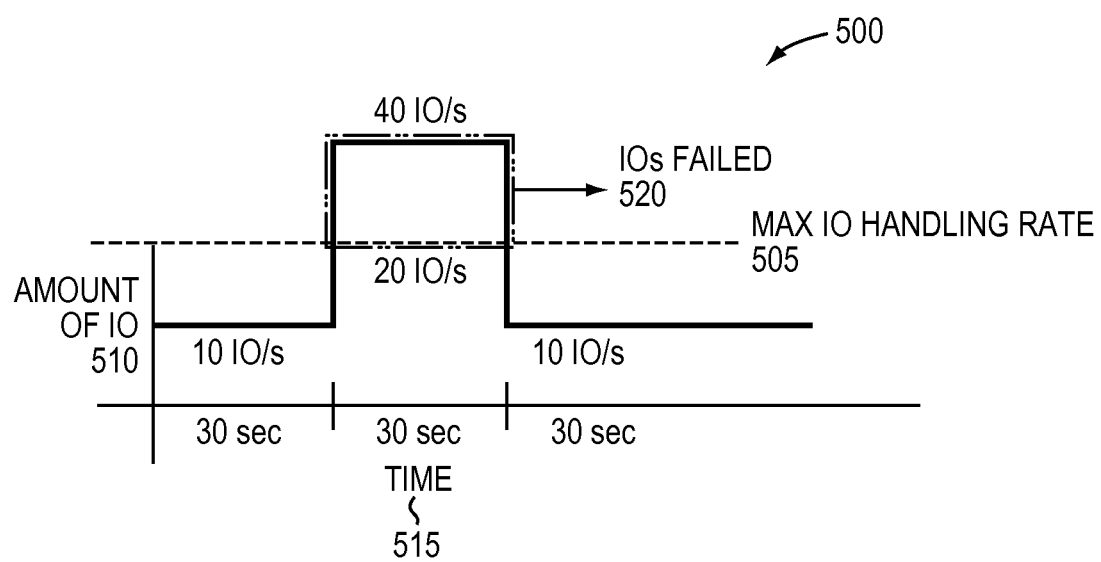
FIG. 5 is a simplified illustration of an IO burst causing IOs to timeout, in accordance with an embodiment of the present disclosure.

Refer now to the example embodiment of FIG. 5, which illustrates an IO surge. Amount of IO 510 is on the Y axis and time 515 is on the X axis. Max IO handling rate 505 is 20 IOs per second. During the first 30 seconds, there are 10 IOs, less the max handling rate and all IO are handled. During the second 30 seconds, there are 40 IOs a second, 20 IOs a second more than can be handled and 20 IOs fail as they exceed the 30 second timeout. During the last 30 seconds, there is again a rate of 10 IOs and all IOs are handled.

Figure 6:
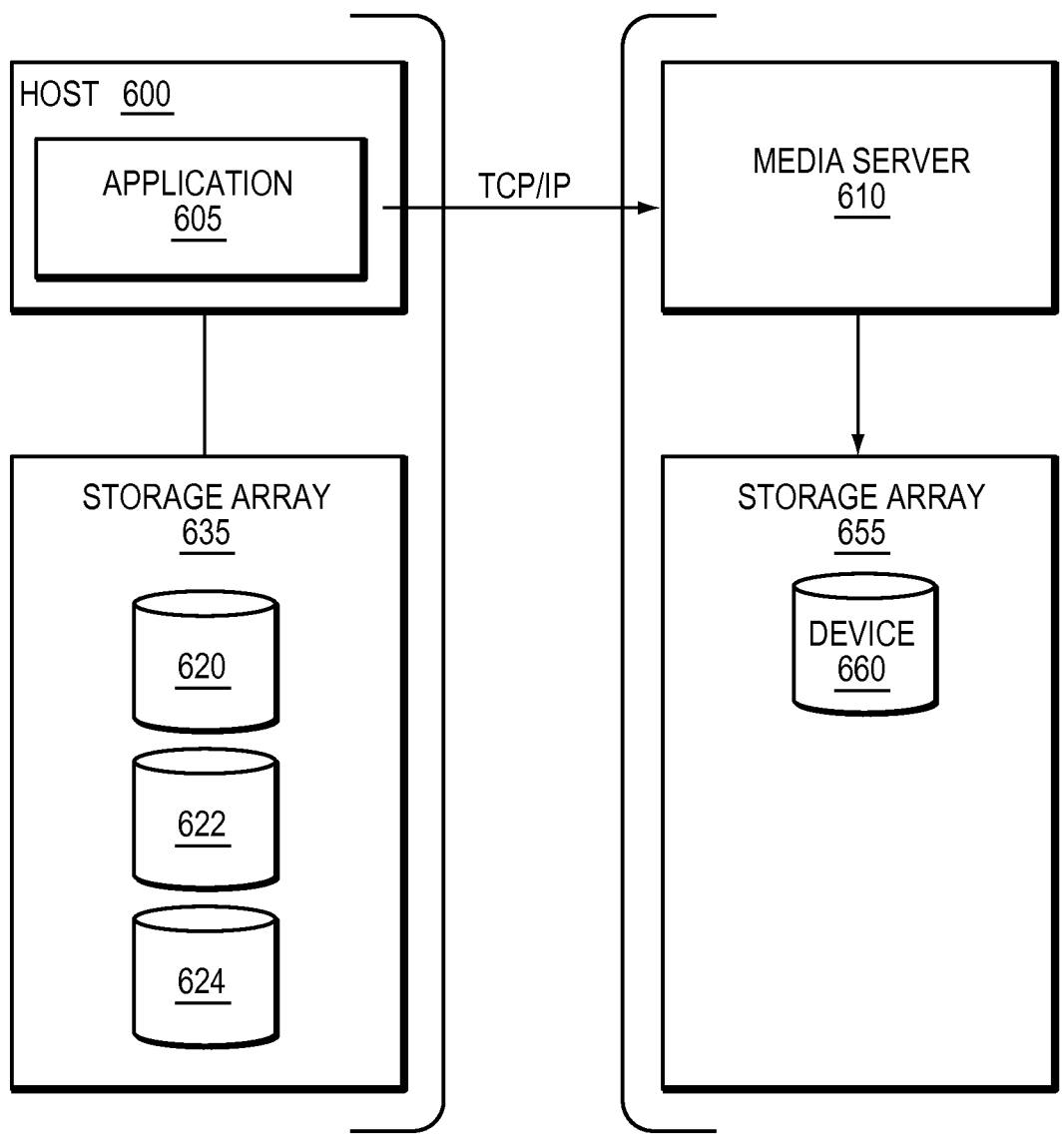
FIG. 6 is a simplified illustration of a data storage environment that may experience IO surges, in accordance with an embodiment of the present disclosure.

Refer now to the example embodiment of FIG. 6, which illustrates a sample storage environment that may experience periodic IO surges. Host 600 sends IO to storage array 635 to be written, based on the IO, to one or more of devices 620, 622, and 624. In this embodiment, it is desired to do a back-up from host 600 of application 605. Media server 610 connects to host back-up. Media server 610 activates a back-up mode in Application 605. Media server 610 uses a file transfer protocol over tcpip to ftp data from application 605 to media sever 610. In this embodiment, the media server does a file level back-up and is enabled to do a file level restore. Thus in this embodiment, if a single file of application 605 is corrupted, then the single file may be restored. In this embodiment, an IO burst may occur causing IO timeouts if application 605 sends too much IO to storage array than may be handled within an IO timeout window, which may cause application 605 to crash. In this embodiment, an IO burst may also cause IO timeouts if Media server 610 sends too many IOs to device 660 on storage array 655 than may be handled within a specified window, which may cause a software application on media server 610 to crash.

Figure 7:
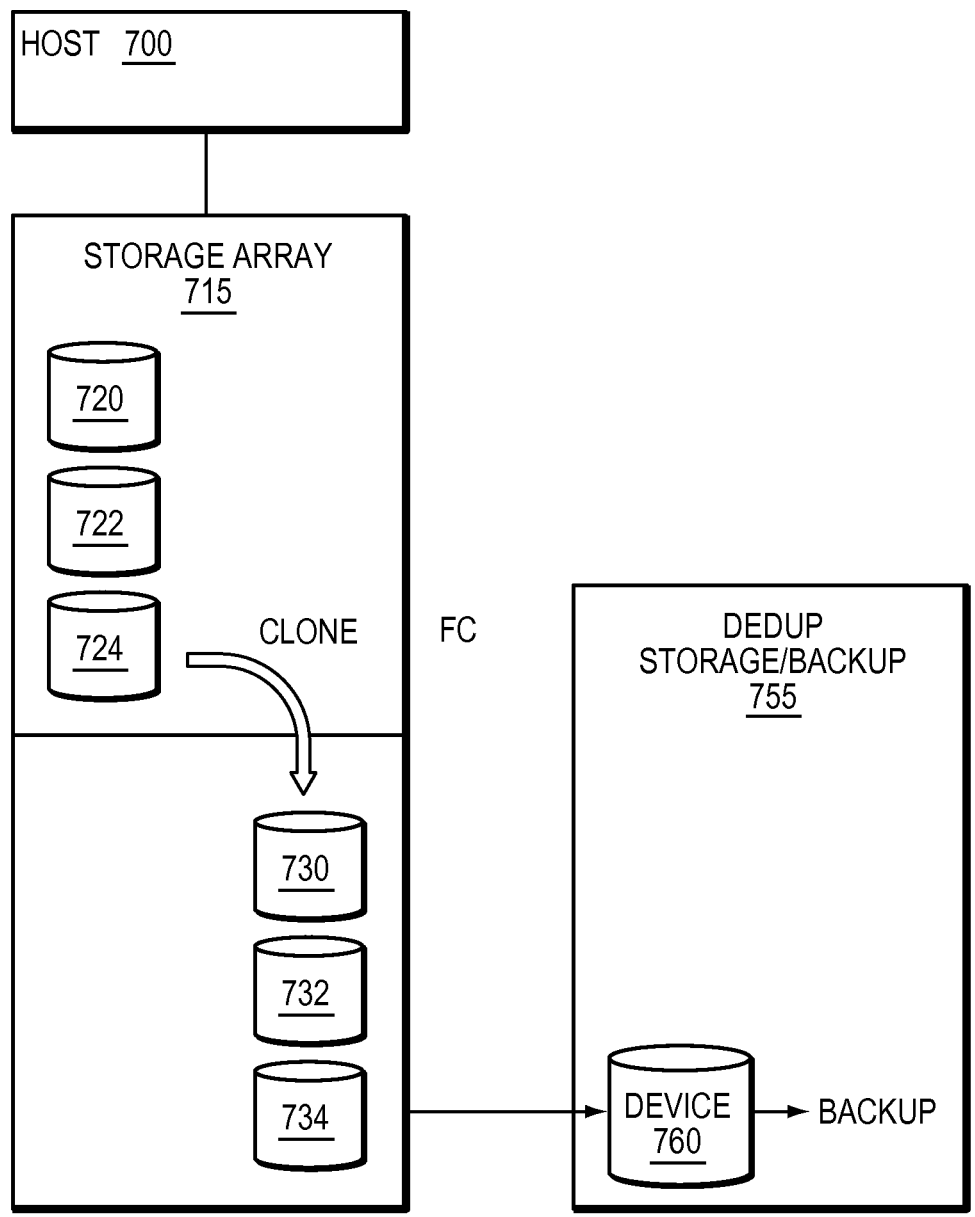
FIG. 7 is a simplified illustration of a data storage environment with data deduplication that may experience IO surges, in accordance with an embodiment of the present disclosure.

Refer now to the example embodiment of FIG. 7. Host 700 writes to one or more devices 720, 733, and 724 on storage array 715. A clone copy of devices 720, 722, and 724 is created on storage array, in as devices 730, 732, and 734, which represents an incremental clone or a crash copy. The incremental clone consisting of devices 730, 732, and 734 is pushed over a fiber channel connection to deduplication server 755 that has storage. Deduplication server 755 takes the data, clone, deduplicates the clone, and then stores the incremental clone copy. In this embodiment, if data is duplicated in the incremental clone, the deduplication will not store the data again, but will instead increment a point to the data to save space on the deduplication device. In some embodiments, there may be an IO surge between storage array 715 to deduplication device 755. In many embodiments, if there is not a mechanism to handle this IO surge, then a copy session failure may occur.

Figure 8:
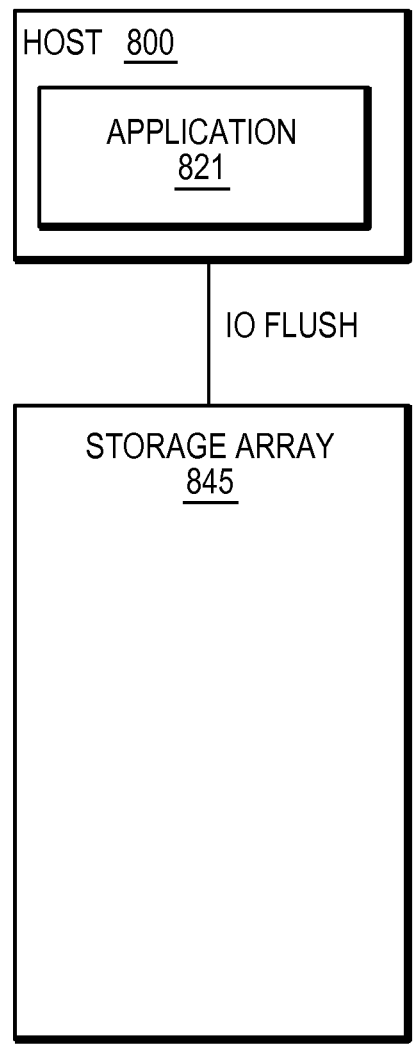
FIG. 8 is a simplified illustration of a data storage environment where a host has a large amount of on board flash that may experience IO surges, in accordance with an embodiment of the present disclosure.

Refer to the example embodiment of FIG. 8, which illustrates host 800 with Application. Host 800 may have several terabytes in flash memory. Host 800 is connected to storage array 845 over a fiber channel connection. If Application 821 performs an IO flush of data in the flash memory, the amount of IO may overwhelm the bandwidth of the array causing an IO timeout and a host reset, which may be associated an application failure.

Figure 9:
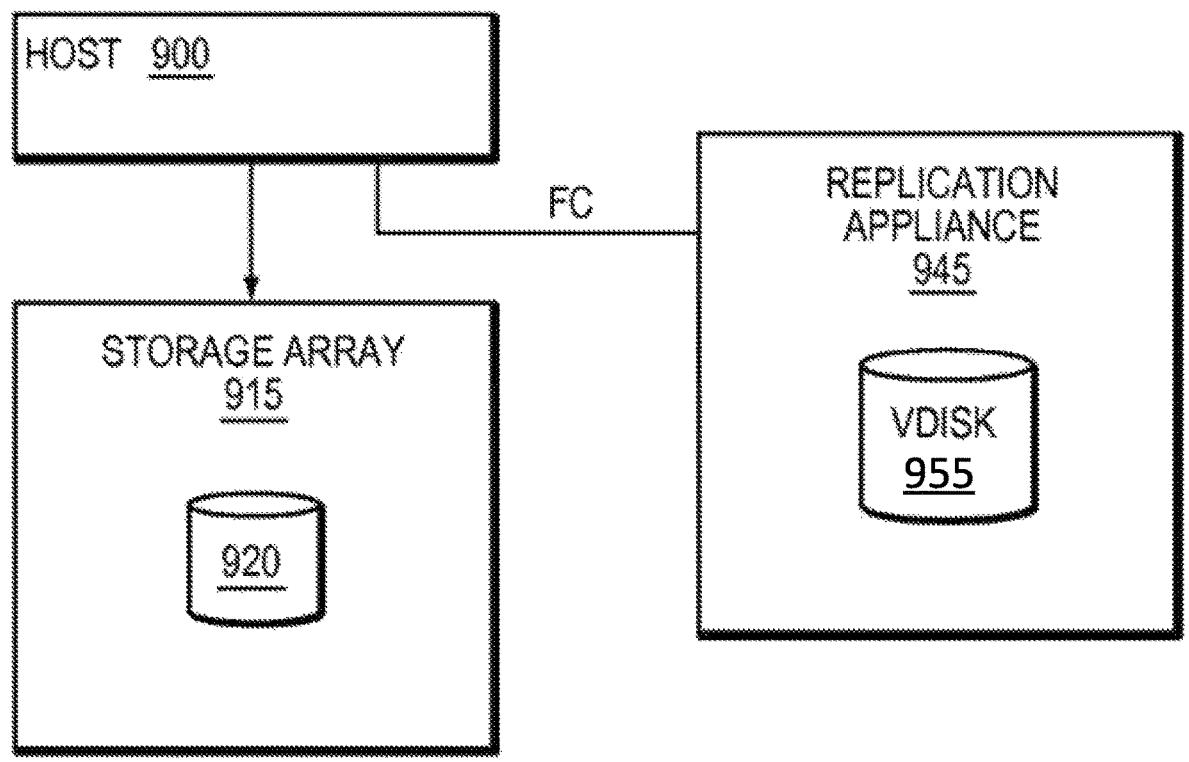
FIG. 9 is a simplified illustration of a replication storage environment that may experience IO surges, in accordance with an embodiment of the present disclosure.

Refer now to the example embodiment of FIG. 9. In the example embodiment of FIG. 9, host 900 sends IO to storage array 915 to be written on device 920. Host 900 also splits IO to be written to recovery appliance 945. The connection between host 900 and replication appliance 945 is over fiber channel. In this embodiment, if there is an IO surge from host 900, the IO processing time may exceed the time for an IO timeout. As well, in this embodiment, host 900 may access vDisk 955 from Replication appliance, where vDisk 955 has been rolled to an image corresponding to a previous point in time. While accessing the previous point in time provided by the VDISK, the IO processing time exceed the IO time out time causing IO to timeout and causing the application to crash.

Figure 10:
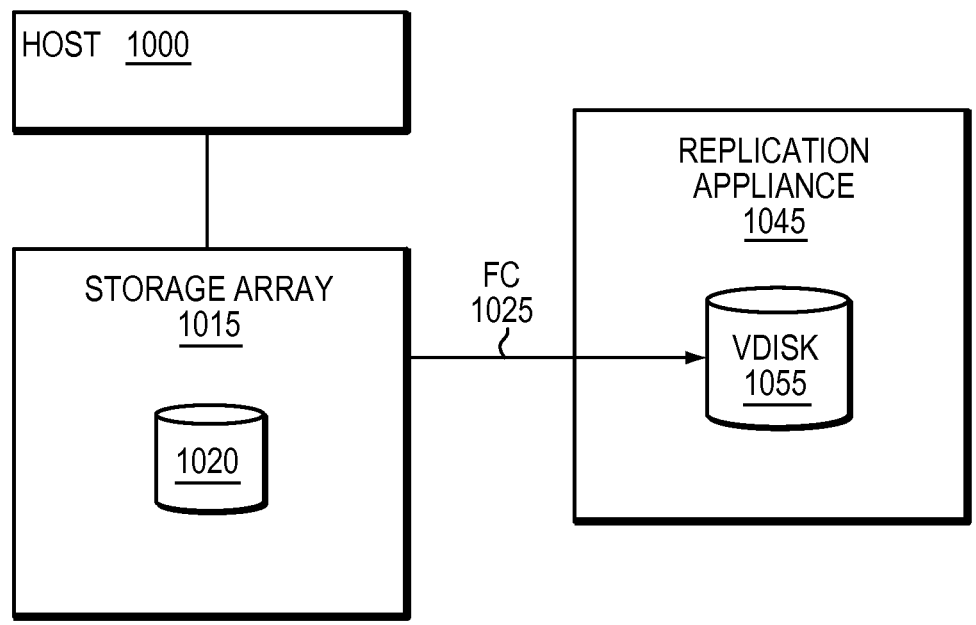
FIG. 10 is a simplified alternative illustration of a replication storage environment that may experience IO surges, in accordance with an embodiment of the present disclosure.

Refer now to the example embodiment of FIG. 10. In the example embodiment of FIG. 10, host 1000 sends IO to storage array 1015 to be written on device 1020. Storage array 1015 splits IO to be written to recovery appliance 1045. The connection between storage array 1015 and replication appliance 1045 is over fiber channel. In this embodiment, if there is an IO surge from storage array 1015 to replication appliance 1045, the IO processing time may exceed the time for an IO timeout. As well, in this embodiment, host 1000 or storage array 1015 may access vDisk 1055 from Replication appliance, where vDisk 1055 has been rolled to an image corresponding to a previous point in time. While accessing the previous point in time provided by the VDISK, the IO processing wait time may again exceed the IO time out time, causing IO to timeout and causing the application to crash.

Figure 11:
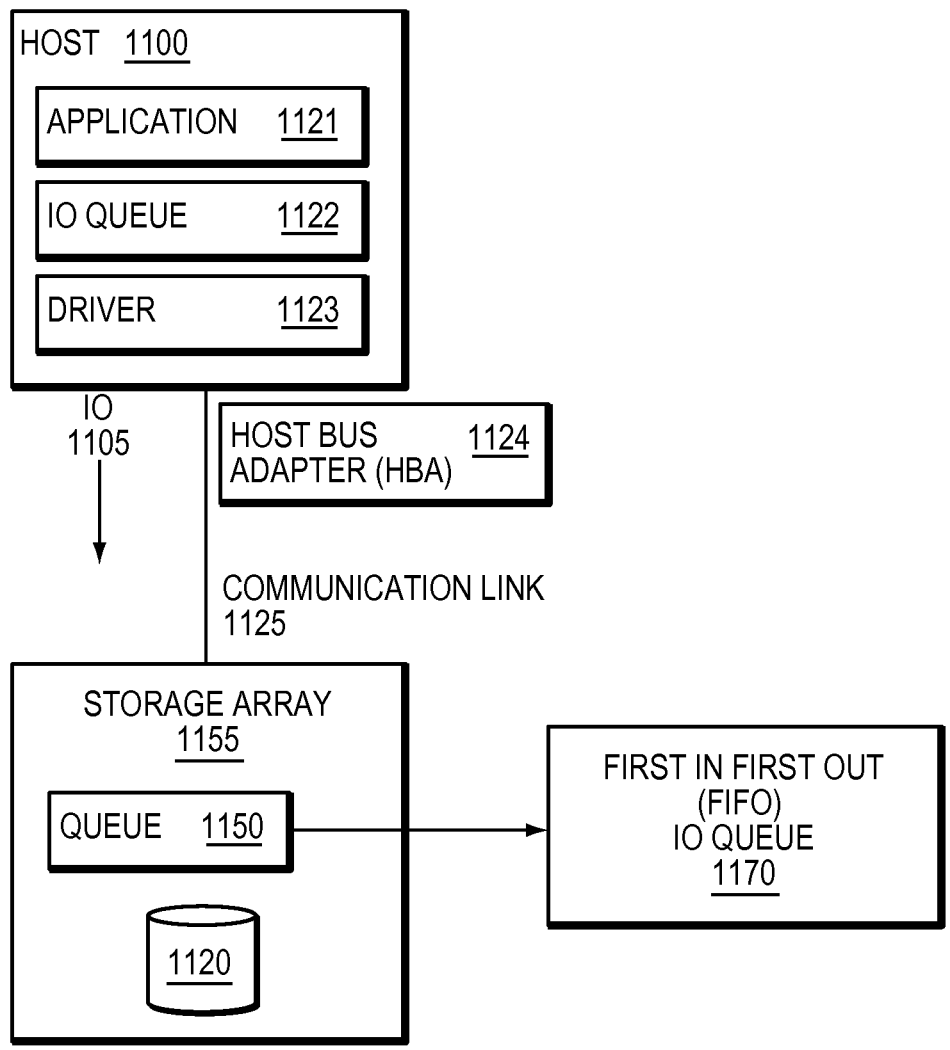
FIG. 11 is a simplified illustration of a data storage environment that may experience IO surges, in accordance with an embodiment of the present disclosure.

Refer now to the example embodiment of FIG. 11, which illustrates a sample IO path from a host to a storage array.

Host 1100 has application 1121 which writes IO to IO queue 1122. Driver 1123 takes IO from IO queue and sends IO 1105 into Host Bus Adapter (HBA) 1124. HBA 1124 sends IO over communication link 1125 to storage array 1155 and the IO is received in Queue 1150, to be written to device 1120. Queue 1150 is a First In First Out (FIFO) IO Queue 1170.

In embodiments 6-11, if an IO's processing time exceeds the IO timeout, then the IO would fail and the IO failure may cause the application to fail. Thus, in most embodiments, it would be beneficial to provide a mechanism so that IO bursts would not overwhelm the system.

Figure 12:
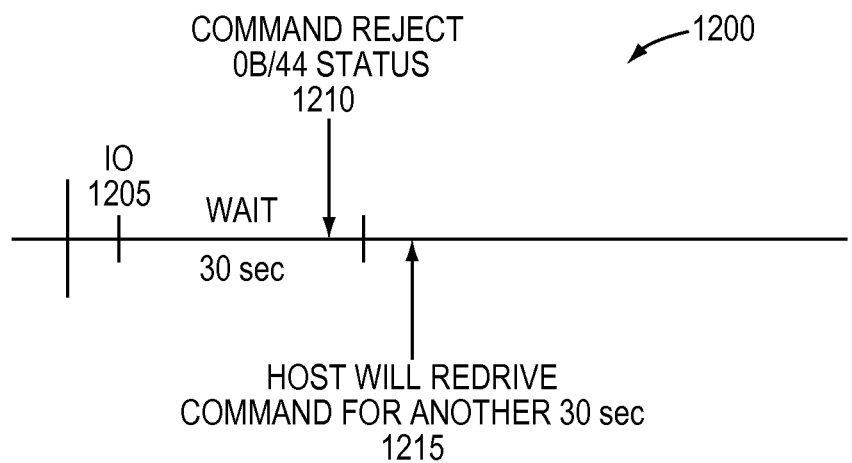
FIG. 12 is a simplified illustration of responding to a command reject OB/44 status, in accordance with an embodiment of the present disclosure.
Figure 13:
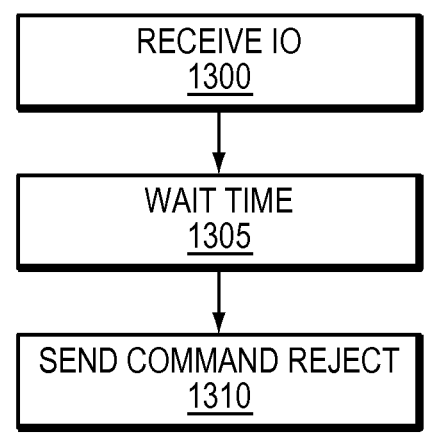
FIG. 13 is a simplified example of a method for responding to a command reject OB/44 status, in accordance with an embodiment of the present disclosure.

Refer now to the example embodiments of FIGS. 12 and 13, which illustrate using a command rejected OB/44 status to avoid an IO failure. In Fiber channel protocol, there is a reject IO status called Command rejection OB/44 status. In many embodiments, this command may be sent back to a host in response to an IO and the host will redrive or resend this command. In the example embodiment of FIG. 12, IO 1205 is received (step 1300). After a wait time of less than 30 seconds (step 1305), command reject OB/44 1210 is sent to a host (step 1310). When the HBA receives the reject status OB/44 it will re-drive or resend the IO with another timeout period.

In many embodiments, a command rejection OB/44 status may be used to avoid IO timeouts. In certain embodiments, the command may be sent close to the IO timeout time, giving extra time to process other pending IO. In most embodiments, the time it takes a host to redrive or resend the command may provide further time for IO processing. In some embodiments, there may be a limit on the amount of times a command reject may be sent before an IO fails. In further embodiments, an algorithm may be used to calculate the wait time before the status is sent and how many times a reject status may be sent. In still further embodiments, an algorithm may evaluate each IO according to a priority, where higher priority IOs are processed first. In many embodiments, an algorithm may calculate IO priority by considering both wait time and the number of times an IO has been rejected. In most embodiments, the device processing the IO, such as a vdisk or storage array, may keep a counter for each rejected IO.

Refer now to the example embodiment of FIG. 14, which illustrates a sample table for keeping track of how many times an IO has been rejected. For a given command, there is a name of the command such as a write. There is a location for this command which is given as a logical block address (LBA). There is also a size (count—how many blocks). Combining the command, location, and size, it is possible to uniquely identify an IO and include a counter of how many times the IO has been rejected. Such a table is illustrated as table 1405

Figure 15:
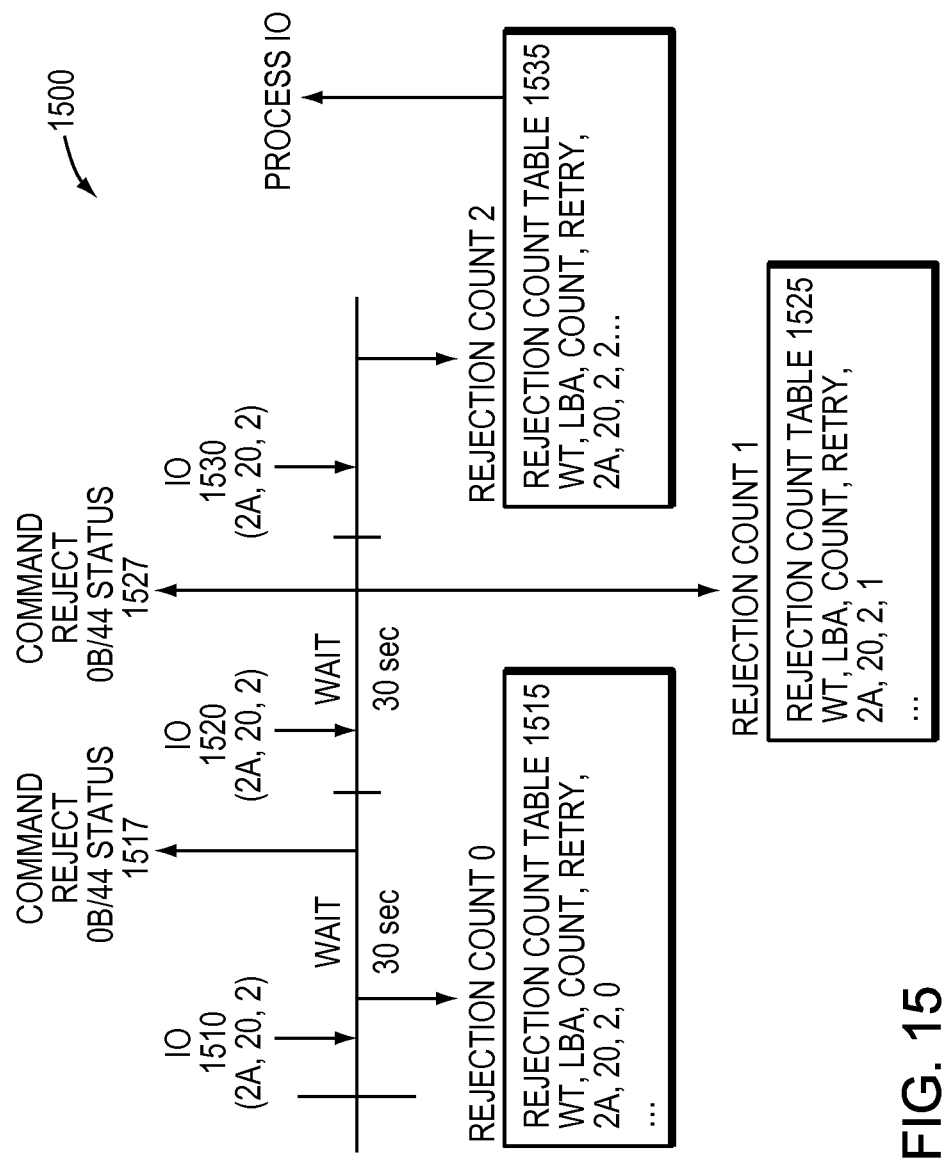
FIG. 15 is a simplified illustration a timeline for rejecting and processing IO, in accordance with an embodiment of the present disclosure.

Refer now to the example embodiment of FIG. 15, which illustrates how an IO may be rejected during periods of high IO load. IO 1510 is received. Per rejection count table 1515, IO 1510 has a WT (write) of 2A, an LBA of 20, a count or size of 2, and has not been rejected. After a wait time of less than 30 seconds, the IO is not processed due to IO load and command reject OB/44 status 1517 is sent to host with respect to IO 1510. A period of time later, host redrives or resends the IO as IO 1520 with the same information (2A, 20, 2). This information is entered into rejection count table 1525, with a rejection count of 1. After a period of time, the IO has again not been processed and command reject 1527 OB 44 status 1527 is sent with respect to IO 1520. A period of time later, host redrives the IO as IO 1540 with the same information (2A, 20, 2) and this information is entered into rejection count table 1535, this time with a rejection count of 2. Based on the rejection count of 2, the IO is given a higher priority and processed.

Figure 16:
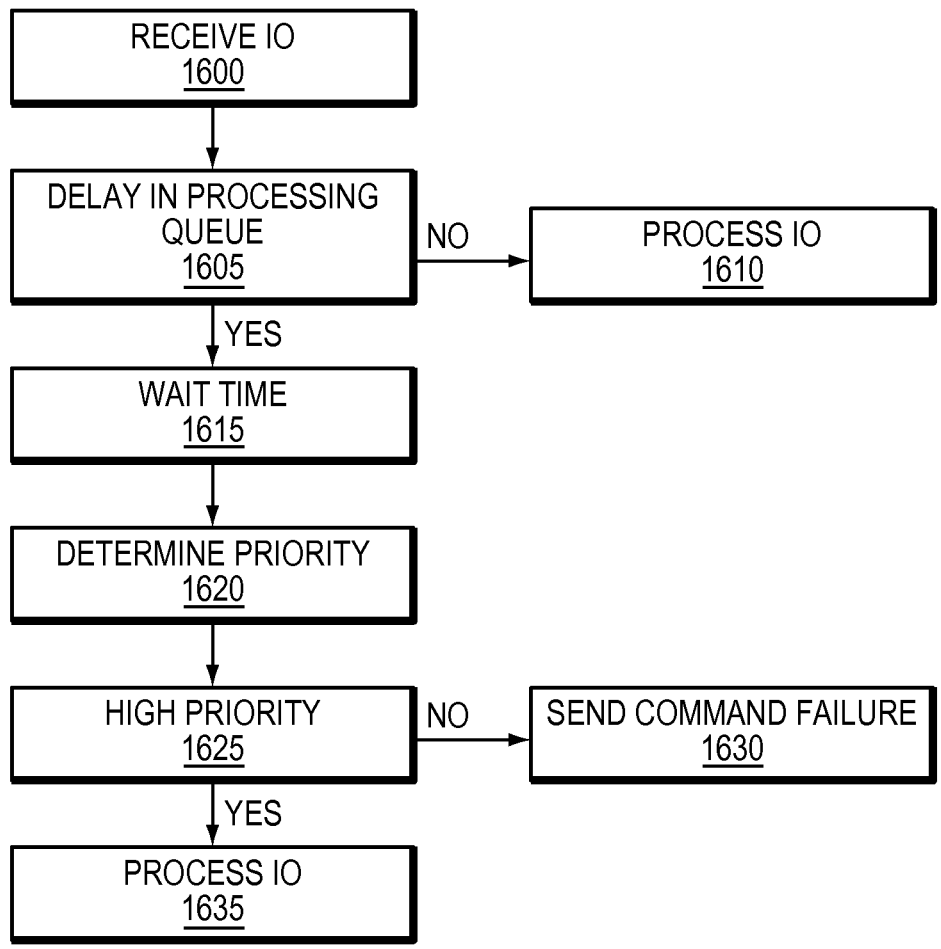
FIG. 16 is a simplified example of a method for processing IO, in accordance with an embodiment of the present disclosure.

Refer now to the example embodiment of FIG. 16, which processing of IO. IO is received (step 1600). It is determined whether there is a delay in the processing queue for IO (step 1605). If there is no delay, the IO is processed (step 1610). In there is a delay, the IO waits to an amount short of the timeout for the IO (step 1615). A priority is determined for the IO (step 1620). If the priority is a high priority (step 1625), the IO is processed (step 1635). If the IO does not have a high priority, a command failure is sent to the host (step 1630).

In many embodiments, an algorithm may be employed to determine the priority of IO. In certain embodiments, the algorithm may consider the amount of time the IO has been rejected. In some embodiments, the algorithm may consider the wait time of the IO. In at least some embodiments, the algorithm may be able to determine the amount of time a host will wait for an IO response as part of the algorithm. In other embodiments, the algorithm may be able to figure out how many times an IO may be rejected before there is an IO failure. In further embodiments, the algorithm may vary use some or all of these factors in determining IO priority. In still further embodiments, the algorithm may learn how to better prioritize IO. In some embodiments, the algorithm may be a machine learning mode. In other embodiments, the algorithm may evolve and may use a genetic programming or a genetic algorithm.

Figure 17:
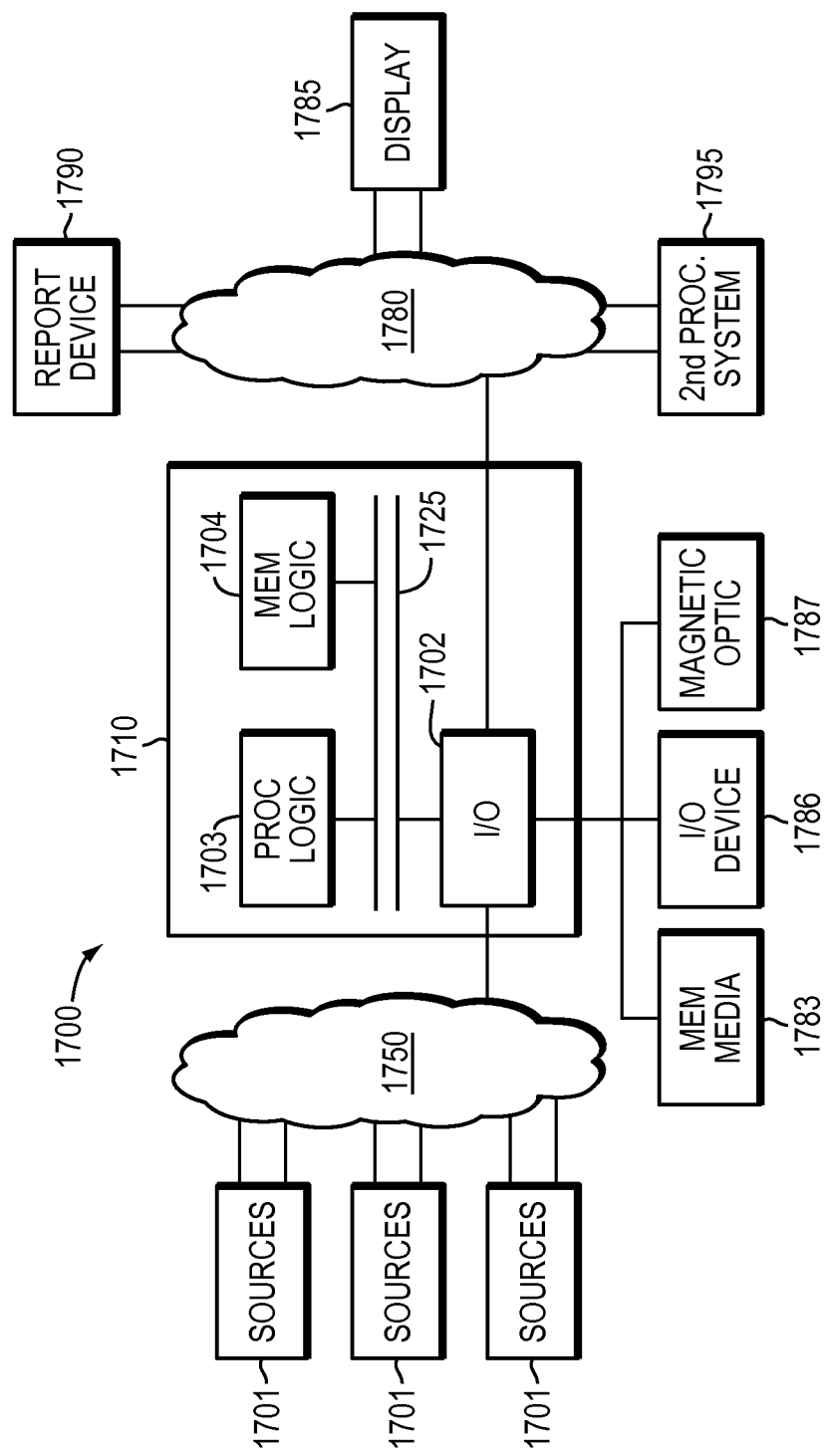
FIG. 17 is an example of an embodiment of an apparatus that may utilize the techniques described herein, in accordance with an embodiment of the present disclosure.
Figure 18:
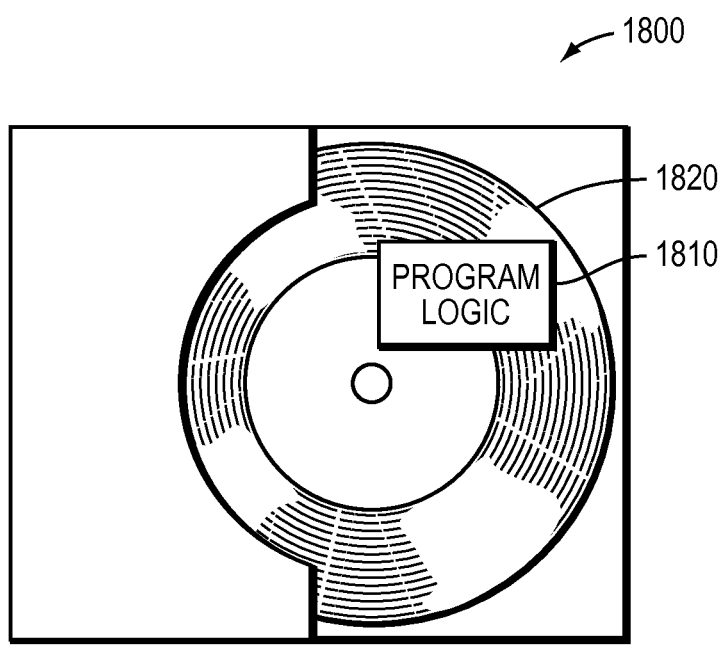
FIG. 18 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 17, the machine becomes an apparatus for practicing the invention. When implemented on one or more general-purpose processors, the program code combines with such a processor 1703 to provide a unique apparatus that operates analogously to specific logic circuits. As such a general purpose digital machine can be transformed into a special purpose digital machine. FIG. 18 shows Program Logic 1834 embodied on a computer-readable medium 1830 as shown, and wherein the Logic is encoded in computer-executable code configured for carrying out the reservation service process of this invention and thereby forming a Computer Program Product 1800. The logic 1834 may be the same logic 1740 on memory 1704 loaded on processor 1703. In some embodiments, the processor may be a virtual or physical processor. The program logic may also be embodied in software modules, as modules, or as hardware modules.

The logic for carrying out the method may be embodied as part of the system described below, which is useful for carrying out a method described with reference to embodiments shown in, for example, FIGS. 2, 4, 13, 14, and 16. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system for Input/Output ("IO") leveling comprising:
   a storage device with an IO queue, wherein the IO queue is enabled to store pending IO received from a second device; and
   computer executable logic operating in memory, wherein the computer-executable program logic is configured for execution by one or more processors of:
   receiving an IO from the second device;
   determining, by the storage device, if there is a delay for processing the IO because of other pending IO in the IO queue;
   based on a positive determination that there is a delay for processing the IO,
   causing the IO to wait for an amount of time less than a timeout associated with the IO;
   determining a priority for the IO; and
   based on the determined priority for the IO, determining whether to process the IO.

2. The system of claim 1 the logic further configured for execution of:
   based on a determination not to process the IO, sending a rejection IO status to the second device to prevent the IO from timing out; wherein the rejection status causes the second device that sent the IO to resend the IO.

3. The system of claim 2 the logic further configured for execution of:
   keeping, in a rejection table, a rejection counter for each IO for which a rejection IO status has been sent to the second device, the rejection counter corresponding to the number of times a rejection IO status has been sent to the second device; and
   increasing the priority for the IO based on the rejection counter for the IO.

4. The system of claim 1 the logic further configured for execution of
   based on a determination that there is not a delay for processing the IO, processing the IO, wherein the priority of the IO is relatively higher than other pending IO.

5. The system of claim 4 wherein a machine learning mode determines the priority of the IO.

6. The system of claim 5 wherein the machine learning mode considers how long the IO has been waiting in determining the priority.

7. A computer implemented method for Input/Output ("IO") leveling comprising:
   receiving an IO at a storage device with an IO queue, wherein the IO queue is enabled to store pending IO received from a second device;
   determining, by the storage device, if there is a delay for processing the IO because of other pending IO in the IO queue;
   based on a positive determination that there is a delay for processing the IO,
   causing the IO to wait for an amount of time less than a timeout associated with the IO;
   determining a priority for the IO; and
   based on the determined priority for the IO, determining whether to process the IO.

8. The method of claim 7 further comprising:
   based on a determination not to process the IO, sending a rejection IO status to the second device to prevent the IO from timing out; wherein the rejection status causes the second device that sent the IO to resend the IO.

9. The method of claim 8 further comprising:
   keeping, in a rejection table, a rejection counter for each IO for which a rejection IO status has been sent to the second device, the rejection counter corresponding to the number of times a rejection IO status has been sent to the second device; and
   increasing the priority for the IO based on the rejection counter for the IO.

10. The method of claim 7 further comprising:
    based on a determination that there is not a delay for processing the IO, processing the IO, wherein the priority of the IO is relatively higher than other pending IO.

11. The method of claim 10 wherein a machine learning mode determines the priority of the IO.

12. The method of claim 11 wherein the machine learning mode considers how long the IO has been waiting in determining the priority.

13. A computer program product comprising:
    a non-transitory computer readable medium encoded with computer executable program code, the code configured to enable the execution by one or more processors of:
    receiving an Input/Output ("IO") at a storage device with an IO queue, wherein the IO queue is enabled to store pending IO received from a second device;
    determining, by the storage device, if there is a delay for processing the IO because of other pending IO in the IO queue;
    based on a positive determination that there is a delay for processing the IO,
    causing the IO to wait for an amount of time less than a timeout associated with the IO;
    determining a priority for the IO; and
    based on the determined priority for the IO, determining whether to process the IO.

14. The computer program product of claim 13 the code further configured to enable the execution of:
    based on a determination not to process the IO, sending a rejection IO status to the second device to prevent the IO from timing out; wherein the rejection status causes the second device that sent the IO to resend the IO.

15. The computer program product of claim 14 the code further configured to enable the execution of:
    keeping, in a rejection table, a rejection counter for each IO for which a rejection IO status has been sent to the second device, the rejection counter corresponding to the number of times a rejection IO status has been sent to the second device; and
    increasing the priority for the IO based on the rejection counter for the IO.

16. The computer program product of claim 15 the code further configured to enable the execution of:
    based on a determination that there is not a delay for processing the IO, processing the IO, wherein the priority of the IO is relatively higher than other pending IO.

17. The computer program product of claim 16 wherein a machine learning mode determines the priority of the IO.

18. The computer program product of claim 17 wherein the machine learning mode considers how long the IO has been waiting in determining the priority.

* * * * *